(12) United States Patent
Ammar (10) Patent No.: US 8,060,339 B2
(45) Date of Patent: Nov. 15, 2011

(54) MULTISTATIC CONCEALED OBJECT DETECTION

(75) Inventor: Danny F. Ammar, Windermere, FL (US)

(73) Assignee: Stalix LLC, Orlando, FL (US)

( * ) Notice: Subject to any disclaimer, the term of this patent is extended or adjusted under 35 U.S.C. 154(b) by 298 days.

(21) Appl. No.: 12/233,063

(22) Filed: Sep. 18, 2008

(65) Prior Publication Data

US 2009/0271146 A1    Oct. 29, 2009

Related U.S. Application Data (60) Provisional application No. 61/047,182, filed on Apr. 23, 2008.

(51) Int. Cl.
*G06F 19/00* (2011.01)
*G01S 13/00* (2006.01)
*A61B 6/03* (2006.01)

(52) U.S. Cl. ............................ 702/155; 342/22; 378/4

(58) Field of Classification Search .............. 702/155; 342/22; 345/420; 382/104; 378/4
See application file for complete search history.

(56) References Cited

U.S. PATENT DOCUMENTS

| | | | | |
|---|---|---|---|---|
| 6,426,995 B1 * | 7/2002 | Kim et al. | ........................ | 378/98.3 |
| 6,504,892 B1 * | 1/2003 | Ning | ........................ | 378/4 |
| 2006/0273255 A1 | 12/2006 | Volkov et al. | | |
| 2007/0205937 A1 | 9/2007 | Thompson et al. | | |
| 2007/0249927 A1 * | 10/2007 | Basser et al. | ........................ | 600/410 |

OTHER PUBLICATIONS

International Search Report for PCT/US2009/39048, mailed May 20, 2009.

* cited by examiner

*Primary Examiner* — Bryan Bui
(74) *Attorney, Agent, or Firm* — King & Spalding LLP (57) ABSTRACT

Concealed object detection using electromagnetic and acoustic multistatic imaging systems and methods. A method of simultaneously screening plural subjects for concealed objects includes transmitting a signal into a screening area where there is at least one subject to be screened having an associated object, receiving a reflected signal from the object when the object is located within the screening area, processing the reflected signal using multistatic Fourier space sampling and tomographic reconstruction to generate a three-dimensional image of the object and displaying the three-dimensional image. The transmitting and receiving are performed using a multi-directional array including at least three sensors. An object detection system includes a screening area, a multi-directional array including at least three sensors, a processor configured to execute multistatic Fourier space sampling and tomographic reconstruction and a display.

14 Claims, 7 Drawing Sheets

MULTISTATIC CONCEALED OBJECT DETECTION

CROSS-REFERENCE TO RELATED APPLICATIONS

This application claims priority from U.S. Provisional Application Ser. No. 61/047,182, filed Apr. 23, 2008, the disclosure of which is hereby incorporated by reference in its entirety.

BACKGROUND

1. Field

The subject matter presented herein relates to concealed object detection using electromagnetic and acoustic multistatic imaging systems and methods.

2. Description of Related Art

Concealed object detection can be a challenge to, for example, the law enforcement and loss prevention communities. Detecting concealed objects, including objects concealed on a person, can involve more than metal detectors. Known people screening systems usually can involve cooperative subjects, can screen one person at a time, and can involve a large number of operators.

SUMMARY

A method of detecting multiple dimensions of an object on a subject comprises transmitting a signal into a screening area wherein at least one subject having an associated object is to be screened; receiving a reflected signal from the object when the object is located within the screening area; processing the reflected signal using multistatic Fourier space sampling and tomographic reconstruction to generate a three-dimensional image of the object; and displaying the three-dimensional image. In one embodiment, the object may be concealed under clothing of the subject.

In one embodiment, the transmitting and receiving can be performed using a multi-directional array comprising at least three sensors. The method can allow for simultaneously screening plural subjects in the screening area. In one embodiment, the method can include detecting the object using automatic target recognition algorithms.

In one embodiment, transmitting a signal can include transmitting electromagnetic waves. In one embodiment, the electromagnetic waves are millimeter waves. In one embodiment, transmitting a signal includes transmitting acoustic waves.

An object detection system comprises a screening area; a multi-directional array comprising at least three sensors, wherein each sensor comprises at least one of a transmitter and a receiver or a receiver, and wherein the transmitter is configured to transmit signals into the screening area and the receiver is configured to receive reflected signals transmitted by the transmitter, the signals having been reflected from an object in the screening area; a processor configured to execute multistatic Fourier space sampling and tomographic reconstruction to generate a three-dimensional image from the reflected signals, the three dimensional image being indicative of the object in the screening area; and a display. In one embodiment, the object is concealed on a subject.

In one embodiment, the transmitter comprises an electromagnetic wave transmitter. In one embodiment, the electromagnetic wave transmitter is a millimeter wave transmitter. In one embodiment, the transmitter comprises an acoustic wave transmitter. In one embodiment, the system can include an ultrasonic transducer.

In one embodiment, a method of simultaneously screening plural subjects for concealed objects comprises transmitting a signal into a screening area wherein at least one subject having an associated object is to be screened; receiving a reflected signal from the object when the object is located within the screening area; processing the reflected signal using multistatic Fourier space sampling and tomographic reconstruction to generate a three-dimensional image of the object; and displaying the three-dimensional image, wherein the transmitting and receiving are performed using a multi-directional array comprising at least three sensors.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals have been used to designate like elements.

DETAILED DESCRIPTION

Figure 1:
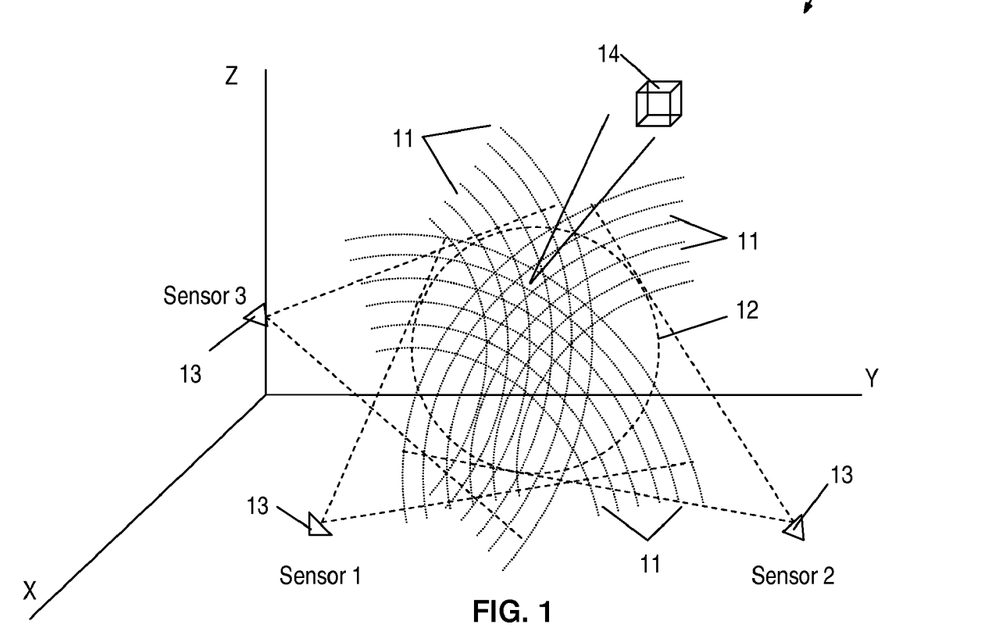
FIG. 1 shows an exemplary multistatic sensor system.

FIG. 1 shows one embodiment of an exemplary system that uses the spatial and geometric diversity of a multistatic network of active sensors to deliver high-resolution images. The multistatic sensor configuration 10 provides the ability to slice, in range 11, the screening area 12 from different directions by multiple sensors 13 allowing for the creation of volume pixels 14 (voxels) that form the basis for generating high resolution 3D images, which can be used for concealed object detection. In one embodiment, the multistatic sensor configuration 10 can be a multi-directional array comprising at least three sensors 13.

Figure 2:
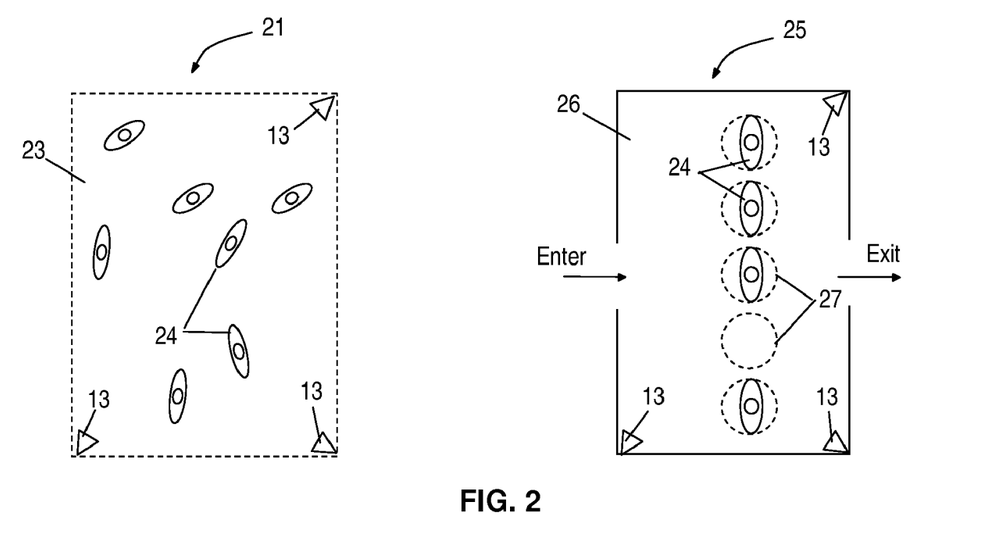
FIG. 2 shows exemplary implementations of a multistatic screening system.

FIG. 2 shows two exemplary scenarios for implementation of embodiments of the multistatic approach. In the first scenario 21, the sensors 13 can be positioned in an open screening area 23 where multiple subjects/people 24 are walking or standing in the area. The sensors 13 can collect data from different directions and create 3D images of each of the subjects simultaneously. This is an example of wide area non-intrusive screening where subjects are unaware and do not have to be cooperative. In one embodiment, the system can prescreen an unlimited number of subjects in an area as large as, for example, 50 m×50 m. In one embodiment, the maximum number of people that can be screened and the maximum size of the screening area may be affected by, for example, the amount of available imagery processing capability.

In the second scenario 25, the subjects 24 enter a screening area 26 and are subjected to cooperative screening. However, in this type of screening there may not be any portals or cameras. The subjects 24 only need to stand for a relatively short time, e.g., a few seconds, in pre-designated spots 27 to be screened. The sensors 13 collect data from different directions and create 3D images of each of the subjects simultaneously, which can be used for concealed object detection.

Sensing and Image Creation Systems

In a multistatic system there can be one or more transmitters and multiple receiver systems, or multiple transmitters and one or more receivers, each positioned in different locations. To qualify as multistatic, a general guideline is that the separation between transmitter and receiver should be comparable to the expected target range.

There can be advantages with multistatic sensing compared with monostatic sensing. Among those advantages are: greater detection range, higher target position measurement accuracy and higher resolution capability.

Known relationships exist for the resolution of an imaging system. In the down-range dimension, resolution, r, is related to the signal bandwidth, B:

$$r = c/2B$$

Where B is the signal bandwidth and c is the speed of light (or sound).

High resolution may be obtained either with a short-duration pulse or by a coded wide-bandwidth signal, such as a linear FM chirp or a step frequency sequence, with the appropriate pulse compression processing.

Angular resolution capability of monostatic sensing can be determined by the beamwidth of the antenna. Therefore, linear resolution capability in a cross-range direction of Ultra Wide Band (UWB) sensors can be usually much worse than resolution capability in range. Cross-range resolution in monostatic sensing can be determined by the product of the range and beamwidth, $\theta_B$. The beamwidth can be determined by the size of the aperture, d, and thus cross-range resolution is given by $$x = R\,\theta_B = R\lambda/d$$

Where R is range to the target
$\lambda$ is the wavelength
d is the antenna diameter (for a circular antenna)

As antenna sizes can be limited by practical aspects, the cross range resolution can be inferior to that in the down range dimension. However, a number of techniques disclosed herein can improve upon this. These techniques can be a function of the change in aspect angle or geometric diversity.

Figure 3:
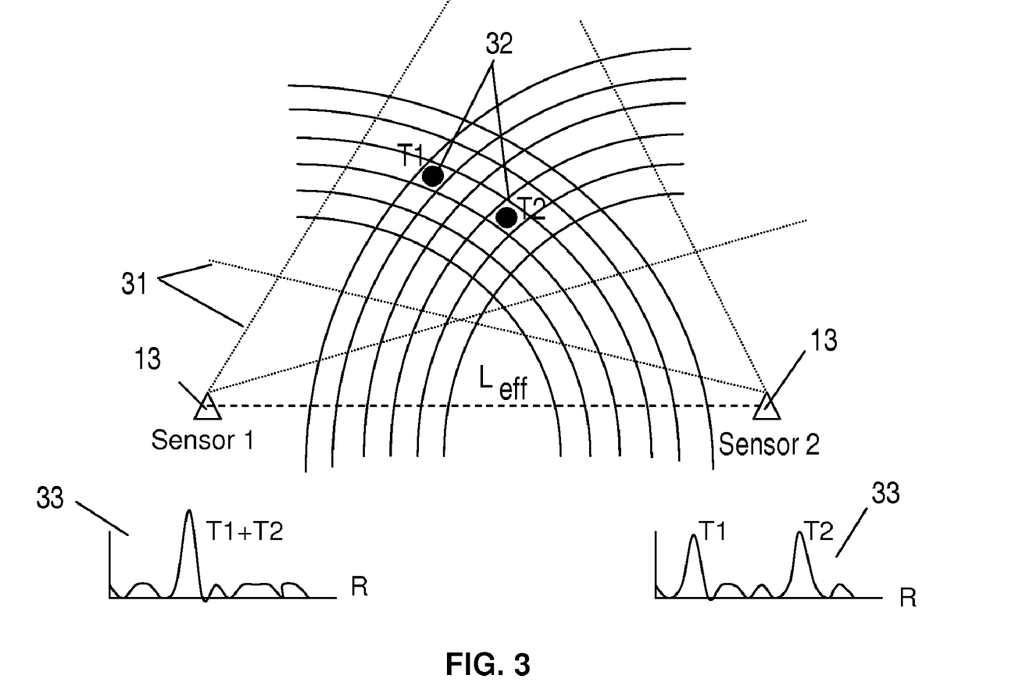
FIG. 3 shows an exemplary diagram of sensor coverage.

It may seem that high angle resolution capability itself is of no practical significance for a UWB sensor having very high range resolution capability because it is sufficient to resolve a target in at least one coordinate (or signal parameter). However, FIG. 3 shows that a region within the intersection of main beams 31 of two UWB sensors 13 provides superior resolution in more than one dimension. Despite very high range resolution capability, each sensor alone may not resolve two targets in the same range, but separated in cross-range. However, using a second sensor looking at the same scene from a different angle can provide the missing information to resolve the two targets 32 that show up at the same range for sensor 1, as shown in the range versus amplitude profiles 33. This is a result of an angular distance between targets, and may be treated as a capability of a multistatic system to resolve targets in angle.

It can be shown that for a target range, R, and an effective baselength, $L_{eff}$, between sensors, the equivalent angular resolution capability, x, of the system (combined sensors 1 and 2) is:

$$x = r/L_{eff} = c/2B\,L_{eff}$$

Where r=c/2B is the range resolution of sensors 1 and 2.

By locating the sensors in a somewhat random manner, the geometric diversity can be enhanced. The sensor data samples can be mapped onto a polar grid in the spatial Fourier domain. The positions of the transmitter and receiver, along with the signal's instantaneous frequency, determine the Fourier space sample position.

Figure 4:
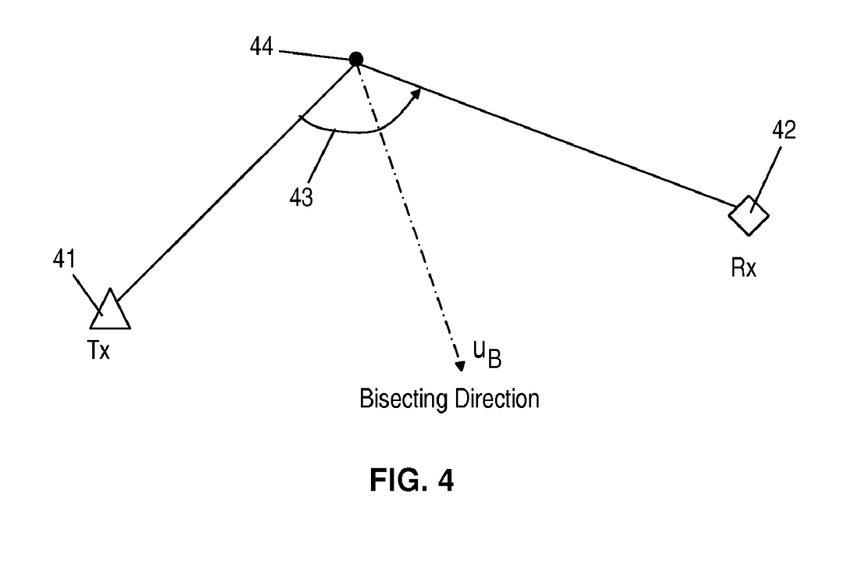
FIG. 4 shows an example of bistatic sensing.

To better understand how multistatic sensing works, FIG. 4 shows a simple case of bistatic sensing. As shown in FIG. 4, the transmitter 41 and receiver 42 are at different locations. The angle 43 between the vector from the target 44 to the transmitter and the vector from the target to the receiver, corresponding to the incident and observed directions of the signal, is called the bistatic angle, $\beta$. For monostatic radar, the bistatic angle is 0°.

This exemplary geometry and signal frequency maps into the Fourier space sample given by the vector F. The sample position lies along the bistatic bisector with a magnitude proportional to the instantaneous frequency scaled by $\cos(\beta/2)$.

$$F = \frac{4\pi f}{c}\cos(\beta/2)u_B$$

Where f is the frequency, c is the speed of light for electromagnetic sensors and the speed of sound for acoustic or ultrasonic sensors, $\beta$ is the bistatic angle, and $u_B$ is the bistatic bisector unit vector.

The complex-valued data collected at transmitting frequency f is a sample of the Fourier transform of the target reflectivity, and is equivalent to a monostatic measurement taken at the bisecting direction and at a frequency of $f \cos(\beta/2)$. In a polar coordinate system, the bisecting direction gives the azimuth coordinate in Fourier space, and $(4\pi f/c)\cos(\beta/2)$ gives the radial coordinate, where c is the speed of light or speed of sound.

As the receiver rotates away from the transmitter, the bistatic angle $\beta$ increases and the equivalent frequency $f \cos(\beta/2)$ decreases. When $\beta$ is 180°, the measurement is a sample located at the origin in Fourier space. Measurements collected from a receiver that rotates 360° around the target lie on a circle in Fourier space, passing through the origin. The diameter of the circle is $4\pi f/c$.

Figure 5:
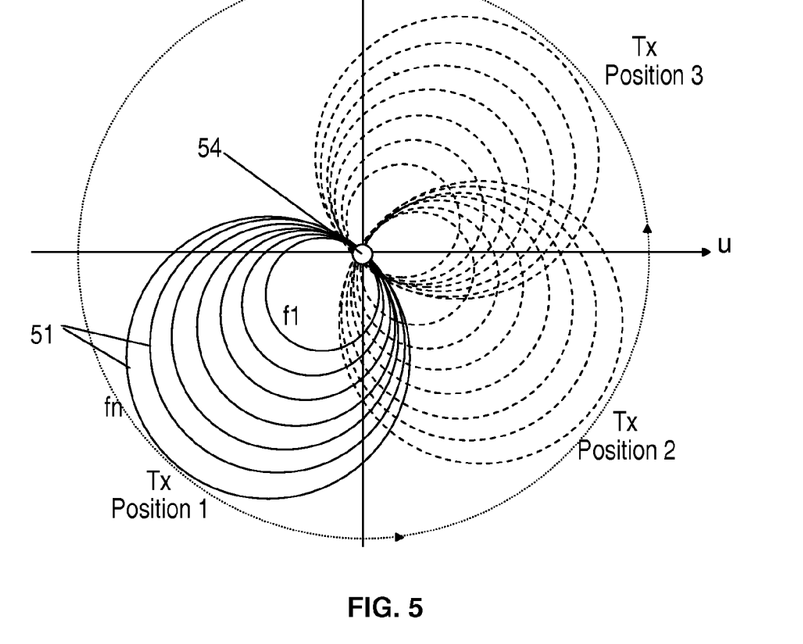
FIG. 5 shows an exemplary multistatic Fourier space.

FIG. 5 illustrates the multistatic Fourier space. Different incident frequencies give data on circles 51 in Fourier space with different diameters. If the transmitter rotates around the target 54, the circle in Fourier space also rotates by the same amount and results in more circles of data in Fourier space.

In the spatial Fourier domain, radial band limiting is due to the finite bandwidth of the transmitted pulse while angular band limiting is due to the finite diversity of look angles. With variations of frequency and angular diversity, the spatial Fourier domain can be sampled in a variety of ways. This spatial Fourier domain sampling can impact the resulting image's resolution. Higher resolution can be achieved with greater diversity, be it frequency, angular or some combination of both. Image resolution can be inversely proportional to the size of the region of Fourier space sampled.

Figure 6:
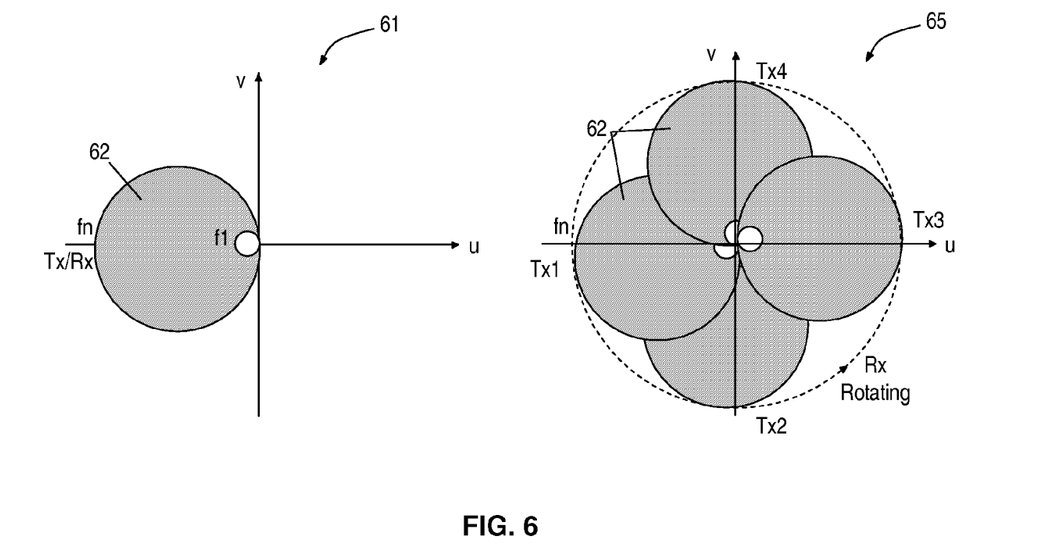
FIG. 6 shows exemplary bistatic geometries.

FIG. 6 illustrates examples of how two different bistatic geometries with wideband waveforms map into Fourier space. In the first example, 61, a wideband waveform is used with a single transmitter as the receiver is moved in a circle about the origin. The resulting Fourier space sampling 62 has a donut shape. In the second example, 65, a wideband waveform is used with 4 transmitters (90 degrees apart) as the receiver is moved in a circle around the origin. The result is four Fourier space samplings 62 covering 360 degrees around the center with some overlap.

Wideband Fourier sampling with multiple transmitters and receivers or transceivers, also referred to here as sensors, is a concept used in one embodiment for a wide area surveillance system. The exemplary geometry shown in FIG. 7 positions multiple transceivers (transmitters and receivers) 71 positioned on a circle, surrounding the region to be imaged (screening area), 72. The transceivers can form concentric circles about the scene (screening area) to be imaged. In this embodiment, the transmitted signal can be wideband. By piecing together the regions sampled by each multistatic transmitter/receiver combination, the result is a multistatic Fourier space sampling.

Figure 8:
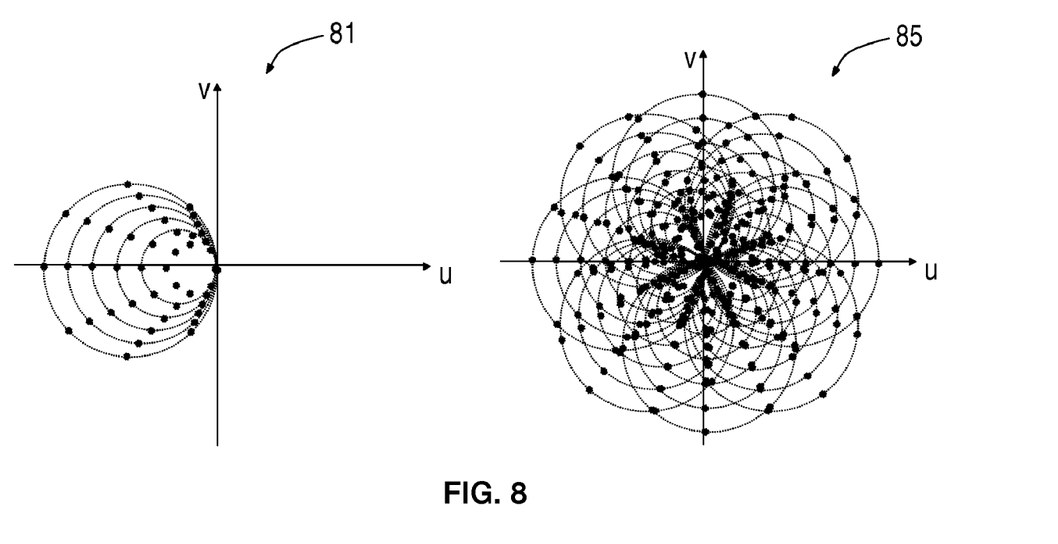
FIG. 8 shows an exemplary multistatic geometry with Fourier space.

In one embodiment, each transmitter with all receivers creates a multistatic geometry with Fourier space, as shown in FIG. 8. In the first example, 81, there can be one fixed transmitter and eight fixed receivers. In the second example, 85, there can be eight fixed transceivers (transmitters/receivers). In one embodiment, at least three sensors can be used. Each sensor can be either a transmitter and a receiver or a receiver.

Figure 9:
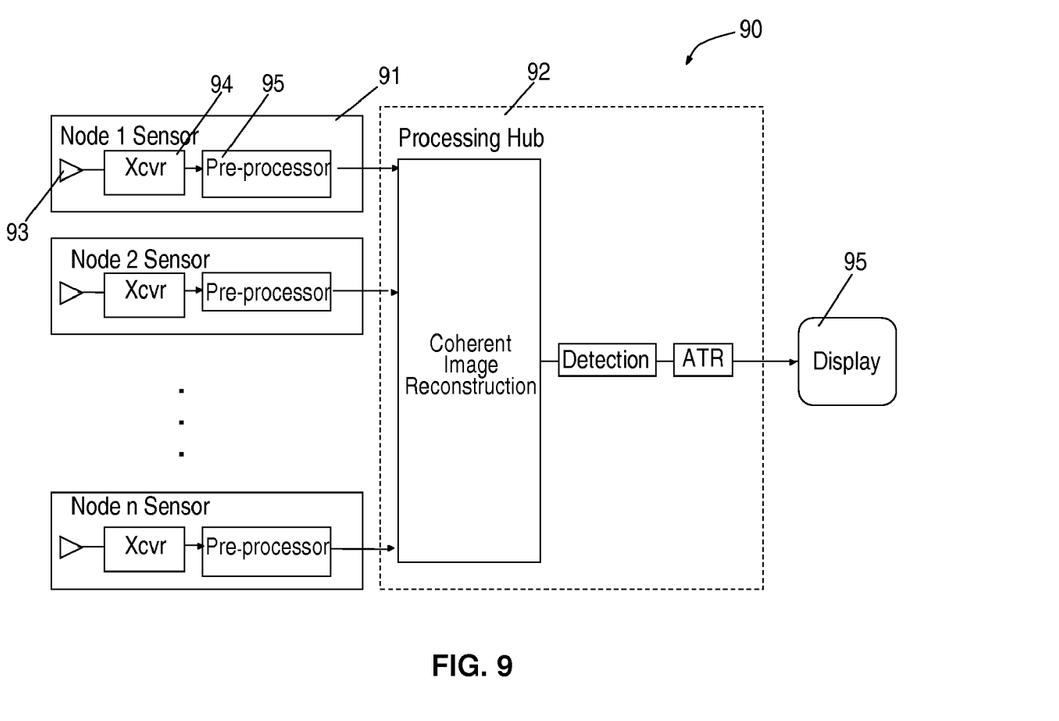
FIG. 9 shows an exemplary multistatic sensor network.

FIG. 9 shows an exemplary multistatic sensor network 90, where the various transceiver positions or sites are designated as nodes 91 and the central processor 92 is designated as a hub. Each node can include, e.g., a collector (e.g., a feedhorn for an electromagnetic sensor or a transducer for an acoustic sensor), broadband transceiver 94 and a preprocessor 95 where in-phase and quadrature (IQ) data can be coherently integrated and then transformed into the frequency domain to create high range resolution. The high range resolution power spectra from each node can be transferred to central processing hub 92 where further processing and 3D image reconstruction takes place. Known detection and automatic target recognition (ATR) algorithms can also be implemented on the reconstructed images. The images can then be presented to an operator on a display 95. Sensor command and control signals can also be sent from the central processor to the sensor via wired or wireless interfaces. Synchronization pulses can also be generated by the central processor to synchronize the sensors operating within the network.

Referring again to FIGS. 7 and 9, one exemplary embodiment of a wide area multistatic object detection system can include screening area 72 and a multi-directional array including at least three sensors 71 where each sensor includes at least one of a transmitter and a receiver, a transceiver or a receiver 71. The transmitter can be configured to transmit signals into the screening area 72. The receiver or transceiver can be at least one of a transceiver or receiver 71 configured to receive reflected signals transmitted by the transceiver/transmitter 71, the signals having been reflected from an object in the screening area. The system can also include a processor 92 configured to execute multistatic Fourier space sampling and tomographic reconstruction to generate a three-dimensional image from the reflected signals, the three dimensional image being indicative of the object in the screening area and a display 95.

Figure 7:
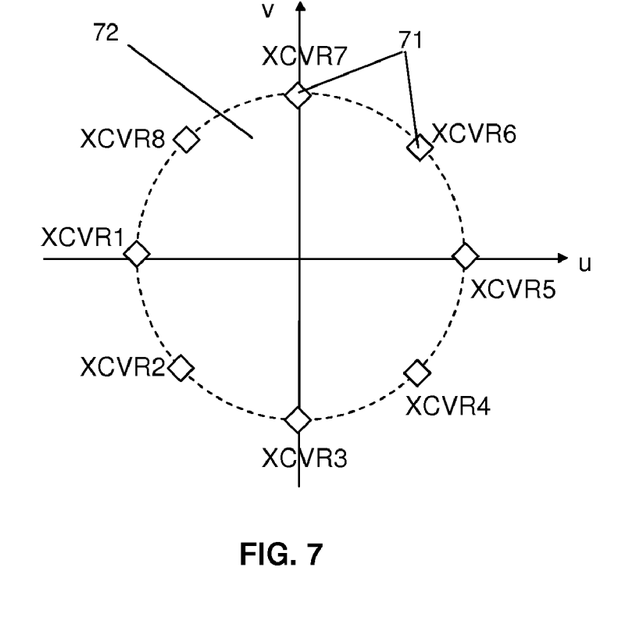
FIG. 7 shows an exemplary wide area surveillance system geometry.

An exemplary method of detecting multiple dimensions of an object on a subject, e.g., a wide area multistatic object detection system, can include transmitting a signal into a screening area 72, wherein at least one subject having an associated object is to be screened, receiving a reflected signal from the object when the object is located within the screening area, processing the reflected signal using multistatic Fourier space sampling and tomographic reconstruction to generate a three-dimensional image of the object and displaying the generated three-dimensional image.

The sensor in each node can use, for example, electromagnetic (radar) or acoustic waves (acoustic transducers). The sensor can generate high range resolution, either through narrow pulses or through use of wideband waveforms (such as FMCW).

As mentioned, one embodiment can include at least three sensors. Each sensor can either be a transceiver, or a transmitter and a receiver, or a receiver. The exemplary embodiments can apply this type of multi-directional and multi-dimensional imaging system to create 3D images of, for example, human subjects collected by electromagnetic or acoustic/ultrasonic waves that can penetrate, for example, clothing. Concealed objects can be detected by inspecting (visually, or with automatic target recognition (ATR) algorithms) the 3D images. The exemplary embodiments then can use tomographic reconstruction, which will be discussed later, to create 3D images from radar or acoustic signals.

The exemplary embodiments can provide a multi-static system that can simultaneously screen multiple subjects in a relatively wide area (i.e., not a portal), such as a screening area 50 m×50 m.

The exemplary embodiments can image a wide area (e.g., the screening area) from multiple directions. The screening area can have one or more subjects in it. The subjects may or may not have any hidden objects concealed under their clothing. The electromagnetic or acoustic/ultrasonic waves can penetrate the clothing. The multi-site sensors can be thought of as analogous to using lights from different directions to avoid shadowing.

In the exemplary embodiments, by using multi-site sensors, high image resolution can be achieved without requiring large antenna apertures on each sensor. The concept of high range resolution slicing from different directions can allow high volumetric resolution to be achieved. This high resolution can provide for the creation of 3D images of the subjects and objects.

Figure 10:
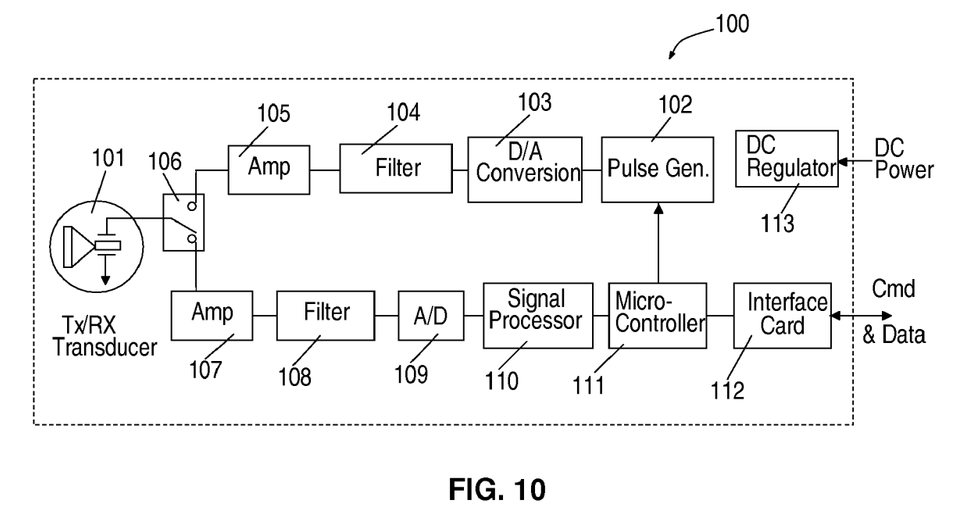
FIG. 10 shows a block diagram of an exemplary acoustic or ultrasonic sensor.

FIG. 10 shows a block diagram of an exemplary acoustic or ultrasonic sensor 100, where an ultrasonic transducer 101 can act as both an emitter and receiver. The ultrasonic transducer operates by applying a high voltage pulse, which lasts a relatively short time, e.g., a few microseconds, and then the system listens for the echoes for a few milliseconds, depending on the range of operation. The acoustic sensor 100 can include a digital pulse generator 102 that creates pulses at the desired frequency, pulse width and pulse repetition. The generated pulses can then be sent to a digital-to-analog converter 103 that transforms the digital pulses into analog signals. The analog signals can then be passed through a filter 104 to remove unwanted harmonics and spurious signals. The filtered signals can then be amplified by the transmitter amplifier 105 and can be passed on to a Transmit/Receive switch 106, which controls the flow of signals in and out of the transducer 101. The transducer 101 converts the electrical signals into acoustic waves that propagate to the target and a portion of the reflected signal propagates back to the transducer.

The reflected ultrasonic waves vibrate the piezoelectric crystal within the ultrasonic transducer 101 and generate voltages which are amplified in the receiver amplifier 107. The amplified signals from the receiver are then passed through a filter 108 that removes unwanted signals and noise. The filtered signals can then be sent to the analog-to-digital converter (A/D) 109 that converts them to digital format. The digital signals can then be processed by the signal processor 110 to extract high range resolution power spectra that can be used by the hub processor for creating 3D images and detecting concealed objects. A mico-controller 111 can be used to synchronize system operation and generate internal commands and communication. An interface card 112 can be used to communicate with external systems and to transfer image data to an external display (not shown). The sensor can also include a DC signal regulator and conditioner 113 to generate the necessary internal voltages.

Figure 11:
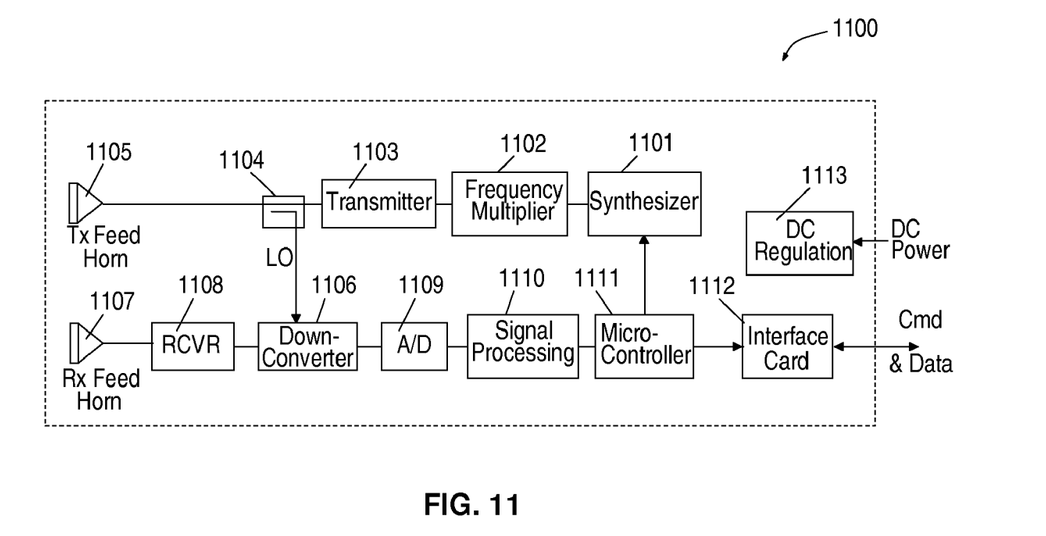
FIG. 11 shows a block diagram of an exemplary electromagnetic sensor.

FIG. 11 shows a block diagram of an exemplary electromagnetic radar sensor of one embodiment operating at high frequencies, preferably in the millimeter wave (MMW) region, where there can be sufficient bandwidth to be able to achieve high range resolution. The radar sensor 1100 can include a frequency synthesizer 1101 that generates the wideband frequency spectrum, a frequency multiplier 1102 that multiplies the synthesizer frequency to the MMW band, a transmitter 1103 to amplify the signal and a coupler 1104 that splits the signal between the transmitter feedhorn 1105 and the down converter 1106.

Signals that are transmitted from the Tx feedhorn 1105 can illuminate a screening area and the reflected signals can be captured by the receive feedhorn 1107 and sent to the receiver 1108 for amplification. The amplified signals from the receiver are down converted to lower frequencies by the down converter 1106 and are sent to the analog-to-digital converter (A/D) 1109 that converts them to digital format. The digital signals can then be processed by signal processor 1110 to create a high range resolution spectra. A mico-controller 1111 can be used to synchronize the system operation and generate internal commands and communication. An interface card 1112 can be used to communicate with external systems and to transfer image data to an external display (not shown). The sensor can also include a DC signal regulator and conditioner 1113 to generate the necessary internal voltages.

Processing By the Hub Processor to Generate 3D Images

As mentioned above, one of the techniques that can be implemented in the processing hub is, e.g., the use of tomography for creating the 3D images. Tomographic techniques were developed originally for medical imaging to provide 2D cross-sectional images of a 3D object from a set of narrow X-ray views of an object over a full 360 degrees. The results of the received signals measured from various angles are then integrated to form an image, by means of various tomographic techniques. Two examples of known tomographic techniques include Filtered Back-Projection (FBP) and Time Domain Correlation (TDC). These techniques are known to a person of ordinary skill in the art of tomography. In the techniques described herein, the observation of an object from a single sensor location can be mapped into Fourier space. Coherently integrating the mappings from multiple viewing angles can enable a three dimensional projection in Fourier space. This can enable a three dimensional image of an object to be constructed using known tomographic techniques, such as wave-front reconstruction theory and back projection where the imaging parameters are determined by the occupancy in Fourier space.

Figure 12:
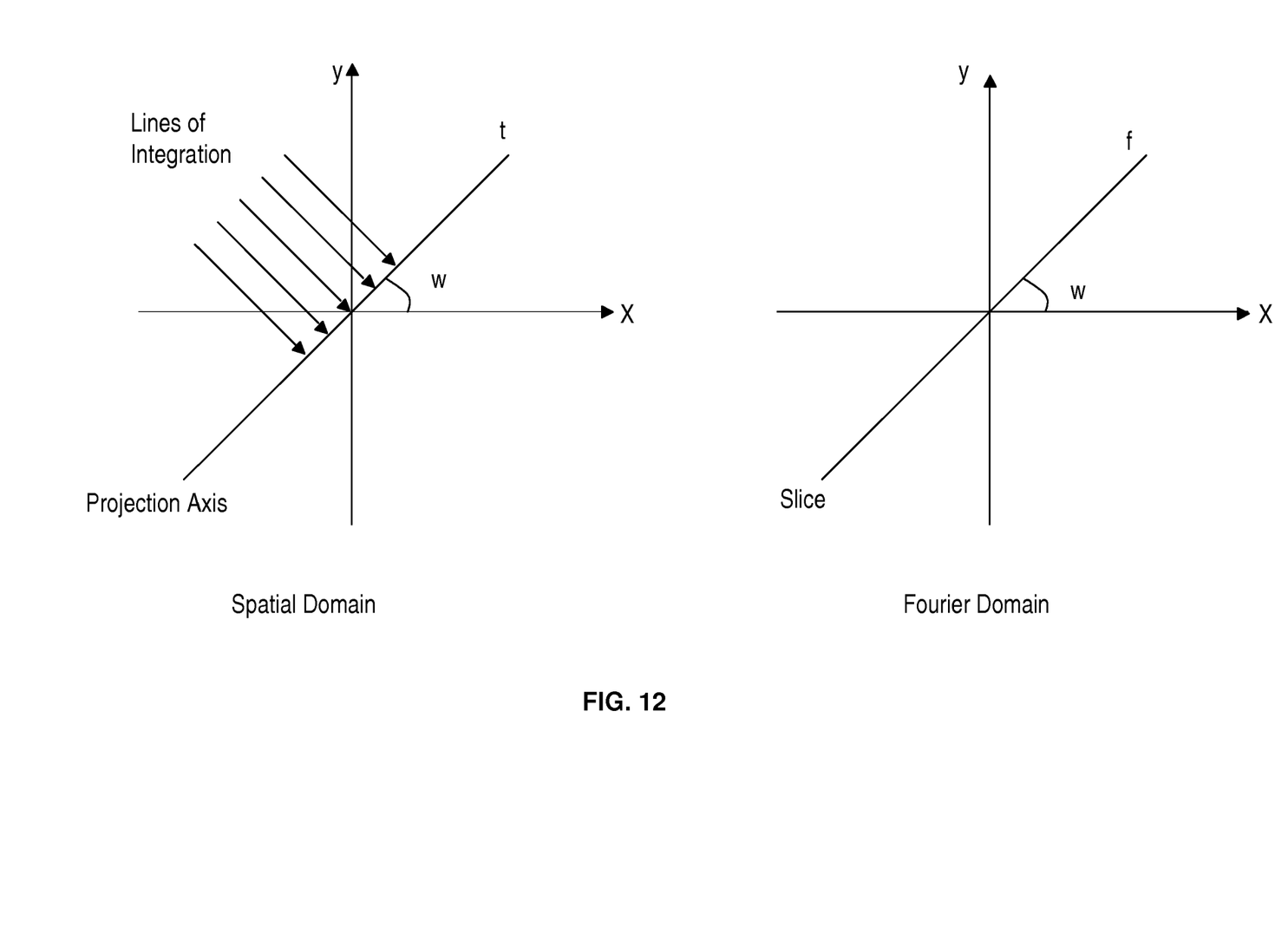
FIG. 12 shows an example of tomographic image reconstruction.

A tomographic reconstruction (TR) algorithm can make use of the projection-slice theorem of the Fourier transform to compute the image. The projection-slice theorem states that the 1D Fourier transform of the projection of a 2D function, g(x, y), made at an angle, w, is equal to a slice of the 2D Fourier transform of the function at an angle w. Whereas some algorithms convert the outputs from many sensors simultaneously into a reflectivity image using a 2D Fourier transform, TR can generate an image by projecting the 1D Fourier transform of each sensor projection individually back onto a 2D grid of image pixels, as shown in FIG. 12. This operation gives rise to the term back-projection. The image can be reconstructed from the projections using the Radon transform.

The FBP method may be used by reconstructing the original image from its projections in two steps: Filtering and Back-projection.

In filtering, the first step of FB preconstruction is to perform the frequency integration. This entails filtering each of the projections using a filter with frequency response of magnitude |f|. The filtering operation may be implemented by ascertaining the filter impulse response required and then performing convolution or a FFT/IFFT combination to correlate the received signal, p(t), against the impulse response.

Back-projection: The second step of FB preconstruction is to perform the angle integration. This projects the 1D filtered projection p(t) onto the 2D image by following steps:

a) Place a pixel-by-pixel rectangular grid over the XY plane, then place the 1D filtered projection, p(t), in position at angle w for each pixel, then get the position of the sample needed from the projection angle and pixel position.

b) Interpolate the filtered projection to obtain the sample. Add this back-projection value multiplied by the angle spacing.

c) Repeat the process for each successive projection.

Known software packages can be adapted to generate the tomographic 3D images from the multistatic sensors.

Creating a high resolution image is a first step. An exemplary goal is also to extract useful information on the desired targets from such imagery. Determining whether the target belongs to a class of concealed objects can rely on the amount of information available. Automatic target recognition (ATR) algorithms can accept pattern vectors from the feature space and decide the class to which the sensed attributes belong.

Exemplary discriminating factors for classification purposes include, for example, image resolution, and signal/noise level. Higher resolution can equate to better point scatterer separation. Higher signal/noise levels can equate to high quality range profiles for classification. Several algorithms may be implemented in both single and multi-perspective environments. One is the statistical Naive Bayesian Classifier. It reduces the decision-making problem to simple calculations of feature probabilities. It is based on Bayes' theorem and calculates the posterior probability of classes conditioned on the given unknown feature vector. A second is a rule-based method for classification: K-Nearest Neighbours (K-NN) algorithm. The rule includes measuring and minimizing the number of K distances from the object to the elements of the training set. Another approach involves Artificial Neural Networks (ANN), where the information contained in the training samples is used to set internal parameters of the network.

Classification performance can be affected, e.g., improved, with increased radars in the network. Since the number of perspectives, and therefore the number of radars, can be related to complexity, costs and execution time of the network, for classification purposes it might be a reasonable trade-off implementing networks involving a small number of nodes.

The disclosed embodiments describe systems and methods that can quickly identify concealed objects, including plastic, liquids and other types of materials using multistatic sensor imaging. The system can rapidly scan people, sending reflected signals from multiple sensors into a high-speed image processor to produce a high-resolution 3-D image. In one embodiment, imaging technology can produce an image in less than a second. The system can be used in a variety of public areas, such as airports, court houses, federal buildings, prisons, schools, sporting events, mass transit systems, nuclear sites, retail outlets, and military checkpoints to minimize delays.

One embodiment is a method of wide area screening using multi-site electromagnetic or ultrasonic imaging sensors that eliminates the need for individual portal screening.

Another embodiment is a method of slicing a wide area of space, in range, from different directions by multiple sensors to allow the creation of tiny volume pixels (voxels) that form the basis for generating high resolution 3D images.

Another embodiment is a method of generating high resolution 3D images to detect and classify concealed objects using tomography processing.

In civilian and military checkpoints, it can be highly desirable to prescreen people at a distance before they approach the checkpoint. A prescreening area can be selected ahead of the check point where cooperative or non-cooperative subjects can be pre-screened from a distance before entering the screening area. Once the subjects are in the individual screening area, they can stand on specific spots where they can be screened simultaneously. In one embodiment, no walk-through portals or cameras are needed to detect and accurately pinpoint the location of concealed objects. Possible threats can be identified before the subjects enter the controlled screening area. Once in the screening area, individual screening may require the subjects to stand in designated spots for less than a second. Dozens of subjects may be screened simultaneously. In one embodiment, there are no portals and no need subject to remove shoes or coats or remove objects from pockets.

The above description is presented to enable a person skilled in the art to make and use the systems and methods described herein, and it is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A system for detecting multiple dimensions of an object on a subject, comprising:
    a multi-directional array comprising at least three sensors positioned about the screening area in a circular geometry, the at least three sensors comprising:
        a transmitter transmitting a signal into a screening area wherein at least one subject having an associated object is to be screened; and
        a receiver receiving a reflected signal from the object when the object is located within the screening area; and
    a processor processing the reflected signal using multi static Fourier space sampling and tomographic reconstruction by projecting a one-dimensional Fourier transform for the reflected signal onto a two-dimensional grid of image pixels and generating a three-dimensional image of the object using a Radon transform; and
    a display displaying the three-dimensional image.

2. The system of claim 1, wherein the object is concealed under clothing of the subject.

3. The system of claim 1, comprising:
    simultaneously screening plural subjects in the screening area.

4. The systm of claim 1, comprising:
    detecting the object using automatic target recognition algorithms.

5. The systm of claim 1, wherein transmitting a signal comprises:
    transmitting electromagnetic waves.

6. The system of claim 5, wherein the electromagnetic waves are millimeter waves.

7. The system of claim 1, wherein transmitting a signal comprises:
    transmitting acoustic waves.

8. An object detection system, comprising:
    a screening area;
    a multi-directional array comprising at least three sensors positioned about the screening area in a circular geometry, wherein each sensor comprises at least one of a transmitter and a receiver or a receiver, and wherein the transmitter is configured to transmit signals into the screening area and the receiver is configured to receive reflected signals transmitted by the transmitter, the signals having been reflected from an object in the screening area;
    a processor configured to execute multistatic Fourier space sampling and tomographic reconstruction by projecting a one-dimensional Fourier transform for the reflected signal on a two-dimensional grid of image pixels and generating a three-dimensional image from the reflected signals using a Radon transform, the three dimensional image being indicative of the object in the screening area; and
    a display.

9. The system of claim 8, wherein the object is concealed on a subject.

10. The system of claim 8, wherein the transmitter comprises:
    an electromagnetic wave transmitter.

11. The system of claim 10, wherein the electromagnetic wave transmitter is a millimeter wave transmitter.

12. The system of claim 8, wherein the transmitter comprises:
    an acoustic wave transmitter.

13. The system of claim 8, comprising:
    an ultrasonic transducer.

14. A system for simultaneously screening plural subjects for concealed objects, comprising:
    a transmitter transmitting a signal into a screening area wherein at least one subject having an associated object is to be screened;
    a receiver receiving a reflected signal from the object when the object is located within the screening area;
    a processor processing the reflected signal using multi static Fourier space sampling and tomographic reconstruction by projecting a one-dimensional Fourier transform for the reflected signal onto a two-dimensional grid of image pixels and generating a three-dimensional image of the object using a Radon transform; and
    a display displaying the three-dimensional image,
    wherein the transmitting and receiving are performed using a multi-directional array comprising at least three sensors positioned about the screening area in a circular geometry.

* * * * *